United States Patent
Weinzierl et al.

(10) Patent No.: US 9,447,729 B2
(45) Date of Patent: *Sep. 20, 2016

(54) AERODIESEL ENGINE

(71) Applicant: Engineered Propulsion Systems, Inc., New Richmond, WI (US)

(72) Inventors: Steven M. Weinzierl, New Richmond, WI (US); Michael J. Fuchs, New Richmond, WI (US)

(73) Assignee: Engineered Propulsion Systems, Inc., New Richmond, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,750

(22) Filed: Oct. 21, 2015

(65) Prior Publication Data

US 2016/0102605 A1  Apr. 14, 2016

Related U.S. Application Data

(63) Continuation of application No. 13/650,569, filed on Oct. 12, 2012, now Pat. No. 9,181,868.

(60) Provisional application No. 61/546,391, filed on Oct. 12, 2011.

(51) Int. Cl.
| | |
|---|---|
| *F02B 75/22* | (2006.01) |
| *F02B 75/24* | (2006.01) |
| *B23P 15/00* | (2006.01) |
| *B64D 27/04* | (2006.01) |
| *F02B 75/00* | (2006.01) |

(Continued)

(52) U.S. Cl.
CPC .............. *F02B 75/246* (2013.01); *B23P 15/00* (2013.01); *B64D 27/04* (2013.01); *F02B 37/007* (2013.01); *F02B 61/04* (2013.01); *F02B 75/00* (2013.01); *F02B 75/18* (2013.01); *F02B 75/22* (2013.01); *F02D 41/0082* (2013.01); *F02D 41/0087* (2013.01); *F02B 2075/1832* (2013.01); *Y02T 50/44* (2013.01); *Y10T 29/49231* (2015.01)

(58) Field of Classification Search
CPC ..... F02B 75/24; F02B 75/243; F02B 75/246
USPC ........................ 123/1 R, 55.2, 55.5, 192.2
See application file for complete search history.

(56) References Cited

U.S. PATENT DOCUMENTS

| | | |
|---|---|---|
| 1,405,093 A | 1/1922 | Beecher |
| 2,076,892 A | 4/1937 | Irgens |

(Continued)

FOREIGN PATENT DOCUMENTS

| | | |
|---|---|---|
| DE | 34 17 349 A1 | 11/1985 |
| DE | 102005001585 | 8/2006 |

(Continued)

OTHER PUBLICATIONS

International Search Report from PCT Application No. PCT/US2012/059946, dated Mar. 29, 2013, 3 pgs.

(Continued)

*Primary Examiner* — Hung Q Nguyen
(74) *Attorney, Agent, or Firm* — Patterson Thuente Pedersen, P.A.

(57) ABSTRACT

The present invention is an aero engine that is provided with compression combustion and weighs less than 725 lbs. The present invention is further a method of forming the aero engine.

15 Claims, 15 Drawing Sheets

(51) Int. Cl.
  *F02D 41/00*   (2006.01)
  *F02B 37/007*   (2006.01)
  *F02B 61/04*   (2006.01)
  *F02B 75/18*   (2006.01)

(56) References Cited

U.S. PATENT DOCUMENTS

| | | | |
|---|---|---|---|
| 2,287,224 | A | 6/1942 | Barkeij |
| 2,610,616 | A | 9/1952 | Woodruff et al. |
| 2,618,250 | A | 11/1952 | Stewart |
| 2,764,961 | A | 10/1956 | Rothwell |
| 2,852,837 | A | 9/1958 | Fageol |
| 3,027,706 | A | 4/1962 | Sprick |
| 3,756,206 | A | 9/1973 | Gommel |
| 4,159,700 | A | 7/1979 | McCrum |
| 4,632,072 | A | 12/1986 | Brogdon |
| 4,966,042 | A | 10/1990 | Brown |
| 5,052,354 | A | 10/1991 | Kindaichi |
| 5,327,863 | A | 7/1994 | Downton et al. |
| 5,493,952 | A | 2/1996 | Daniel et al. |
| 5,555,730 | A | 9/1996 | Hope |
| 5,878,703 | A | 3/1999 | Sweeney |
| 6,073,595 | A | 6/2000 | Brogdon |
| 6,564,767 | B1 | 5/2003 | Reese |
| 7,191,742 | B2 | 3/2007 | Fuchs et al. |
| 9,181,868 | B2 * | 11/2015 | Weinzierl ............... F02B 75/22 |
| 2002/0023615 | A1 | 2/2002 | Dreymuller et al. |
| 2003/0015166 | A1 | 1/2003 | Seymour |
| 2003/0221655 | A1 | 12/2003 | Surnilla et al. |
| 2005/0198957 | A1 | 9/2005 | Kim |
| 2007/0028867 | A1 | 2/2007 | Fuchs et al. |
| 2008/0006739 | A1 | 1/2008 | Mochida et al. |
| 2009/0173821 | A1 | 7/2009 | Bhargava |
| 2010/0024759 | A1 | 2/2010 | Dobransky |
| 2011/0030654 | A1 | 2/2011 | Taylor |
| 2011/0139111 | A1 | 6/2011 | Stephan |
| 2011/0180037 | A1 | 7/2011 | Blom |

FOREIGN PATENT DOCUMENTS

| | | | |
|---|---|---|---|
| DE | 102009010746 | | 7/2010 |
| JP | 06050158 A * | 2/1994 | ............ F02B 37/00 |
| JP | 2006-161657 | | 6/2006 |
| JP | 2007-224743 | | 9/2007 |
| KR | 10-2010-0100340 | | 9/2010 |
| WO | WO 9931371 | | 6/1999 |

OTHER PUBLICATIONS

Written Opinion from PCT Application No. PCT/US2012/059946, dated Mar. 29, 2013, 7 pgs.

Extended European Search Report from EP Application No. 12839362.6, dated Oct. 30, 2015, 5 pgs.

* cited by examiner

Crank Rotation Direction:
 Opposite To Right Hand Rule Around +Z-axis (CCW in Tractor Flight direction)

Prop Rotation Direction:
 According To Right Hand Rule Around +Z-axis (CW in Tractor Flight direction)

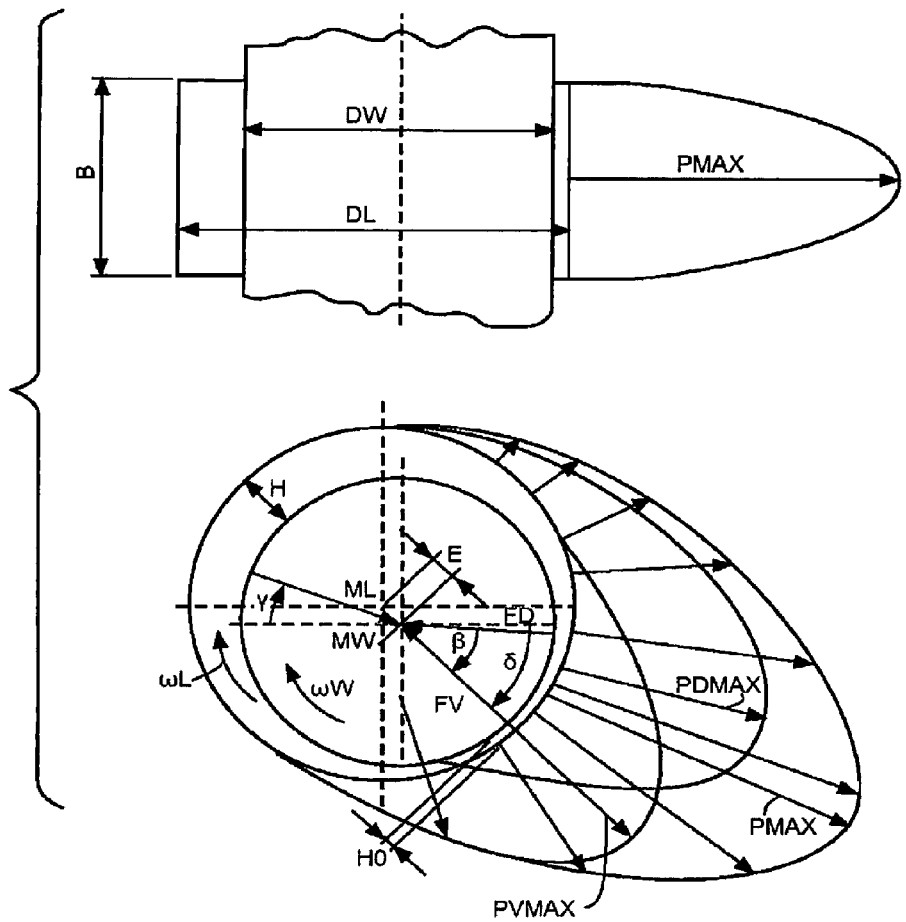

| | Bearing width [mm] | $p_{Dmax}$ | Maximum lubricant film |
|---|---|---|---|
| $d_L$ | Bearing diameter [mm] | $p_{Vmax}$ | pressure caused by rotation |
| $d_W$ | Shaft diameter [mm] | | and squeeze effect [MPa] |
| $e$ | Eccentricity | $\beta$ | Angular position of $h_0$, |
| $F$ | Bearing load [N] | | relative to $F_0$ |
| $F_p, F_V$ | Bearing load portions | $\delta$ | Angular postion of $h_0$ |
| | caused by rotation and | $\gamma$ | Angular position of bearing |
| | squeeze effect [N] | | load $F$ |
| $h$ | Lubricant film thickness [mm] | $\omega_L$ | Angular velocity of bearing |
| $h_0$ | Minimum lubricant film thickness [mm] | $\omega_W$ | Angular velocity of shaft |
| $p_{max}$ | Maximum lubricant film pressure [MPa] | $\psi$ | Relative clearance $\left(\dfrac{d_L - d_W}{d_L}\right)$ |

*Fig. 8*

AERODIESEL ENGINE

RELATED APPLICATION

This application is a continuation of application Ser. No. 13/650,569 filed Oct. 12, 2012, now issued as U.S. Pat. No. 9,181,868, which claims the benefit of U.S. Provisional Application No. 61/546,391 filed Oct. 12, 2011, each of which is hereby fully incorporated herein by reference.

FIELD OF THE INVENTION

The present invention is an aero engine useful in the fields of general aviation and unmanned aviation. More particularly, the present invention is a compression combustion engine adapted for use in the aviation environment.

BACKGROUND OF THE INVENTION

At least since WWII, light aircraft (General Aviation and, more recently, unmanned aircraft (UAVs)) have been powered by an aircooled, gasoline fueled engine that was typically formed in an opposed six cylinder arrangement. Such engines were fueled by very high octane AvGas. Problematically, the non availability of AvGas in the remote portions of the world has meant that general aviation was largely unavailable in such areas, the very areas of the world that need general aviation services the most. More recently it has been seen that refineries have been reluctant to produce AvGas, thereby stretching the world's supply. While all fuels are not cheap, AvGas has been especially costly.

In contrast to the relative scarcity and costliness of AvGas, relatively inexpensive diesel fuel and/or jet fuel (JP) is much more generally available throughout the world. While the quality of such fuel can vary greatly from place to place, a compression combustion engine can burn either diesel fuel or jet fuel (JP) about equally as well. The variances can be recognized as variance in the Cetane number (CN) of the fuel, a knowable characteristic of the fuel.

However, such a compression combustion engine presents a number of challenges to its designer, including:
- a torque signature friendly for propeller harmonics;
- fuel systems redundancy;
- turbocharging design;
- Bank-Bank main bearing loading; and
- descent power requirements.

There is a need worldwide for an aero engine that can operate on such fuel (diesel fuel or jet fuel (JP)), yet accounts for the challenges noted above.

SUMMARY OF THE INVENTION

The applicant has conceived of a novel "Flat-Vee" engine to address the concerns of the General Aviation (GA) industry in the next decades. The engine concept utilizes novel diesel technology to enhance the efficiency of the present aircraft, and allow aircraft manufacturers access to emerging markets. The advantage of the Flat-Vee is that it utilizes engine architecture that makes an efficient use of material to allow the diesel to be weight competitive with present technology. The weight of the present engine is comparable to the weight of air-cooled, opposed six cylinder engines and yet has eight cylinders and is of compression combustion design.

To address vibration concerns, the engine of the present invention has utilized a "paired throw" concept that is used in conjunction with a first order balance system to minimize vibration for aircraft structures and passenger comfort.

The usual method that engine designers take, is to determine a crankshaft shape that works to provide the following parameters:
- uniform engine firing;
- satisfactory engine external balance; and
- minimum bearing loads for the engine main bearings.

Although the calculations that are necessary to determine the best trade-offs can become rather complex when multiple cylinder engines are contemplated, the technique is well documented to determine a serviceable solution.

On a first approach the firing order of a new engine concept is contrived with a relatively systematic approach, as noted above. In approaching the firing order for the present engine, several other criteria unique to the aero environment were used to contemplate possible firing orders, including:
- a torque signature friendly for propeller harmonics;
- fuel systems redundancy;
- turbocharging concepts;
- Bank-Bank main bearing loading; and
- descent power requirements.

After considering the previous variables, a new firing order was incorporated into the present engine that offers systems advantages beyond those arrived upon by the traditional techniques noted above. This firing order gives the flat-vee engine of the present invention capabilities that offer superior performance in the aircraft engine role.

The engine of the present invention includes novel elements that provide the following:

1. A firing order for the paired-throw crankshaft configuration. The firing order (1-7-5-3-6-4-2-8), is unique for the aero engine application.

2. The unique firing order noted above allows the engine to be "electrically separated" in a bank-to-bank fashion for the purpose of engine redundancy.

3. The unique firing order also allows for separate fuel systems in a bank-to-bank configuration that can allow an aircraft to operate running only one bank (four cylinders of the eight cylinders) of the engine.

4. The firing order further allows the engine to be configured in a bank-bank configuration from an air handling perspective. Turbochargers can be configured to independently charge each engine bank, thereby allowing the engine to run on a bank-to-bank configuration in a redundant fashion.

5. The novel firing order allows the eight cylinder engine to operate as a four-cylinder engine with relatively evenly spaced firing pulses.

6. The ability to run the an eight cylinder engine in four-cylinder mode allows the injectors of the operating bank to run with an enhanced efficiency by running the firing cylinders at a higher load.

7. The new firing order does not "double fire" from a bank's perspective (that is to fire adjacent cylinders of a bank sequentially as such adjacent firing tends to cause the oil film in the main bearings to "break down".

8. The additional inertial and frictional load of an eight cylinder engine, as compared to the prior art six-cylinder engine, is sufficient to allow the engine to run on one bank of cylinders without causing a torsional disturbance to the propeller system.

9. One bank of the flat-vee engine can be shut down to enhance the fuel economy of the aircraft when necessary, adding to the overall safety of the system.

10. Bank deactivation is also used to stabilize combustion in aircraft descents at reduced loads, a very important consideration in UAV applications.

11. Shared systems bank-to-bank, such as the cooling system, act as a thermal battery to moderate combustion, and stabilize the engine when only one bank is operating.

12. The shared lubrication system allows one half of the engine to operate with thermal stability in the event of a cooling system failure. That is, the oil system is sufficient to cool the pistons/engine when the heat from 4 operational cylinders is absorbed in the entire thermal mass of the engine via conduction heat transfer.

The present invention is an aero engine that is provided with compression combustion and weighs less than 725 lbs. The present invention is further a method of forming the aero engine.

BRIEF DESCRIPTION OF THE DRAWINGS

FIG. 8 is a graphic depiction of hydrodynamic bearing parameters;

DETAILED DESCRIPTION OF THE DRAWINGS

Figure 1:
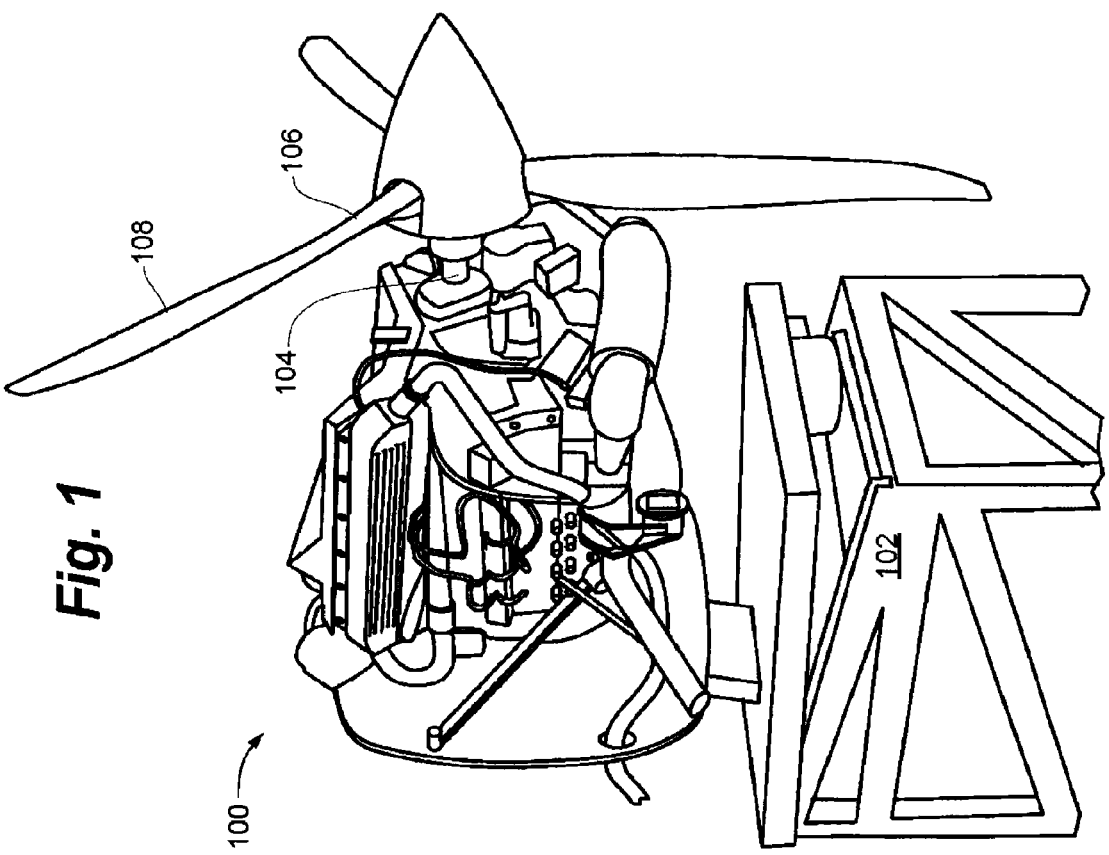
FIG. 1 is a perspective view of the engine of the present invention mounted on a test stand and coupled to a propeller.
Figure 2:
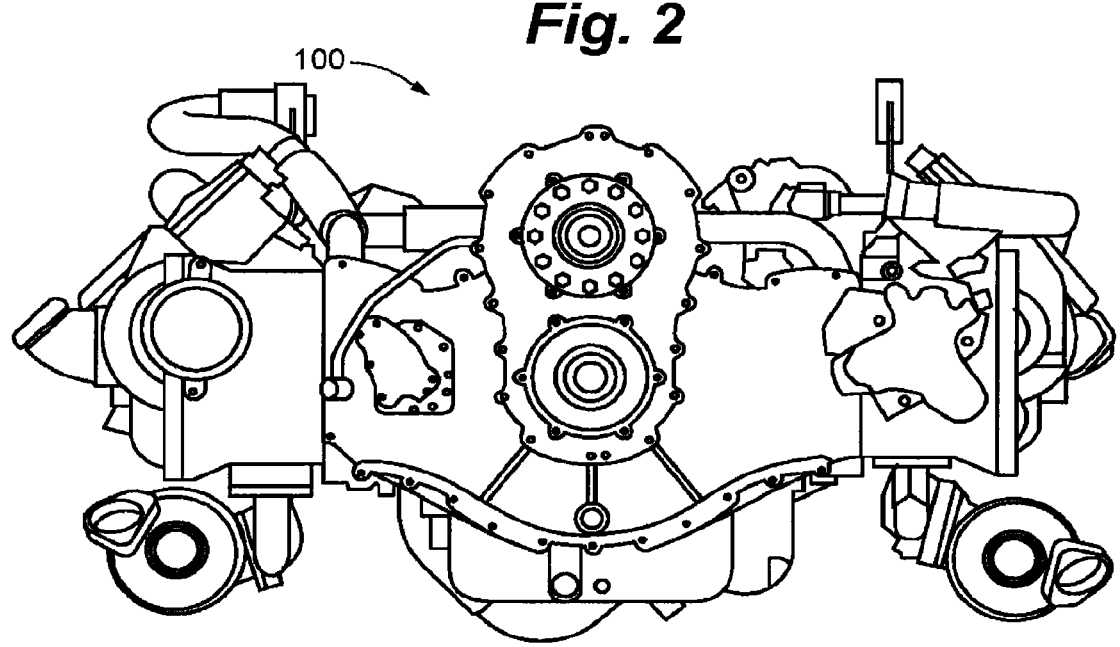
FIG. 2 is a front elevational schematic of the engine of claim 1.
Figure 3:
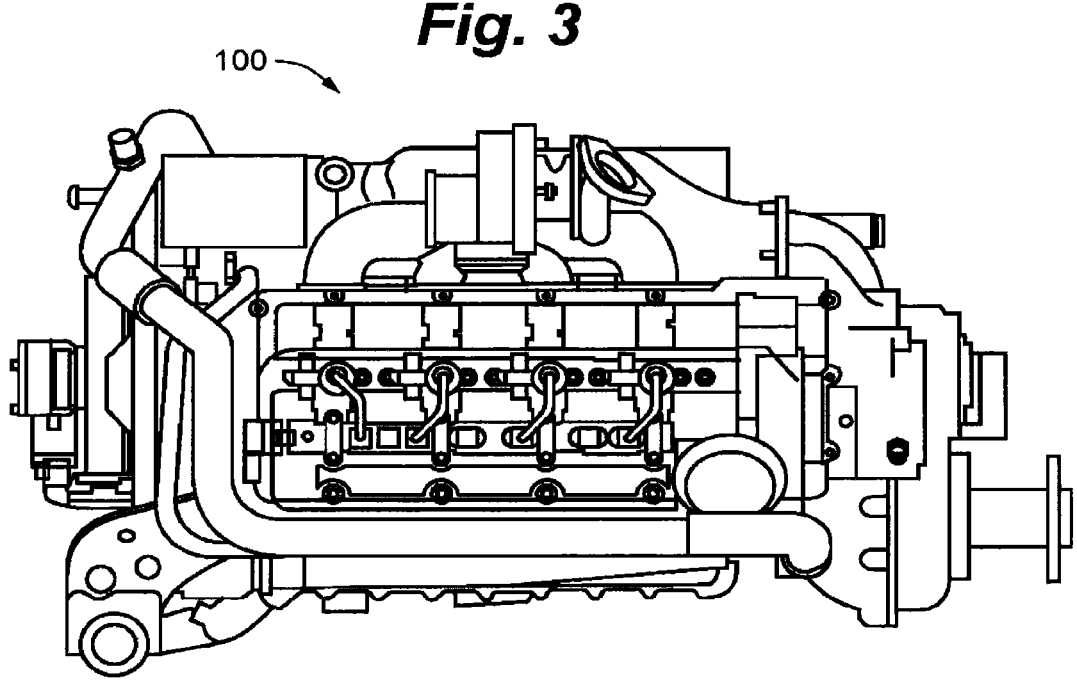
FIG. 3 is a side elevational schematic of the engine of claim 1.

The engine of the present invention is shown generally at 100 in FIGS. 1-3. In an exemplary configuration, the engine 100 is operably coupled to a transfer member 104, the transfer member being operably coupled to a propeller 106. The propeller 106 has three blades 108, in this particular example. Other numbers of blades 108 are possible. It should be noted that the engine 100 weighs no more that 725 lbs with it usual accessories and is preferably of a 4.4 L displacement, although larger or smaller displacements may be utilized. The engine 100 develops at least 300 hp. FIGS. 2 and 3 are schematic representations of the engine 100. The engine 100 is operably coupled to a test stand 102. The engine 100 is of eight cylinders in a flat opposed configuration with four cylinders in a first bank and an opposed four cylinders in a second bank, as noted in greater detail below.

The engine 100 of the present invention utilizes the increased cylinder count, eight, as compared to existing aero engines, six cylinders, as an approach to minimize torque fluctuations with the intent of increasing propeller life and decreasing the engine 100 vibrational signature. The Flat-Vee configuration is used to primarily decrease the weight of the diesel engine by minimizing the amount of crankcase material used in its construction. Additionally, the flat construction is useful in aircraft having multi-engine configurations, where the aerodynamic drag of the engine packages becomes more critical. A flat configuration proves to be aerodynamically advantageous where reduced drag is critical.

Many crankshaft configurations are possible in a given engine. The forces generated by the rotating crankshaft 110 of FIG. 4 were evaluated in the design of the engine of the present invention. As noted in FIG. 5, the sum of the free forces ($F_{rot}$, $F_I$ & $F_{II}$) and the free moments (M1 & M11) are independent of the firing order and interval.

The forces generated by the rotating crankshaft 110 are a function of the following elements of the engine design:
  piston weight;
  rod weight and center of gravity location Rod length versus crank throw length;
  counterweight mass;
  cylinder pitch spacing; and
  engine speed.

Figure 5:
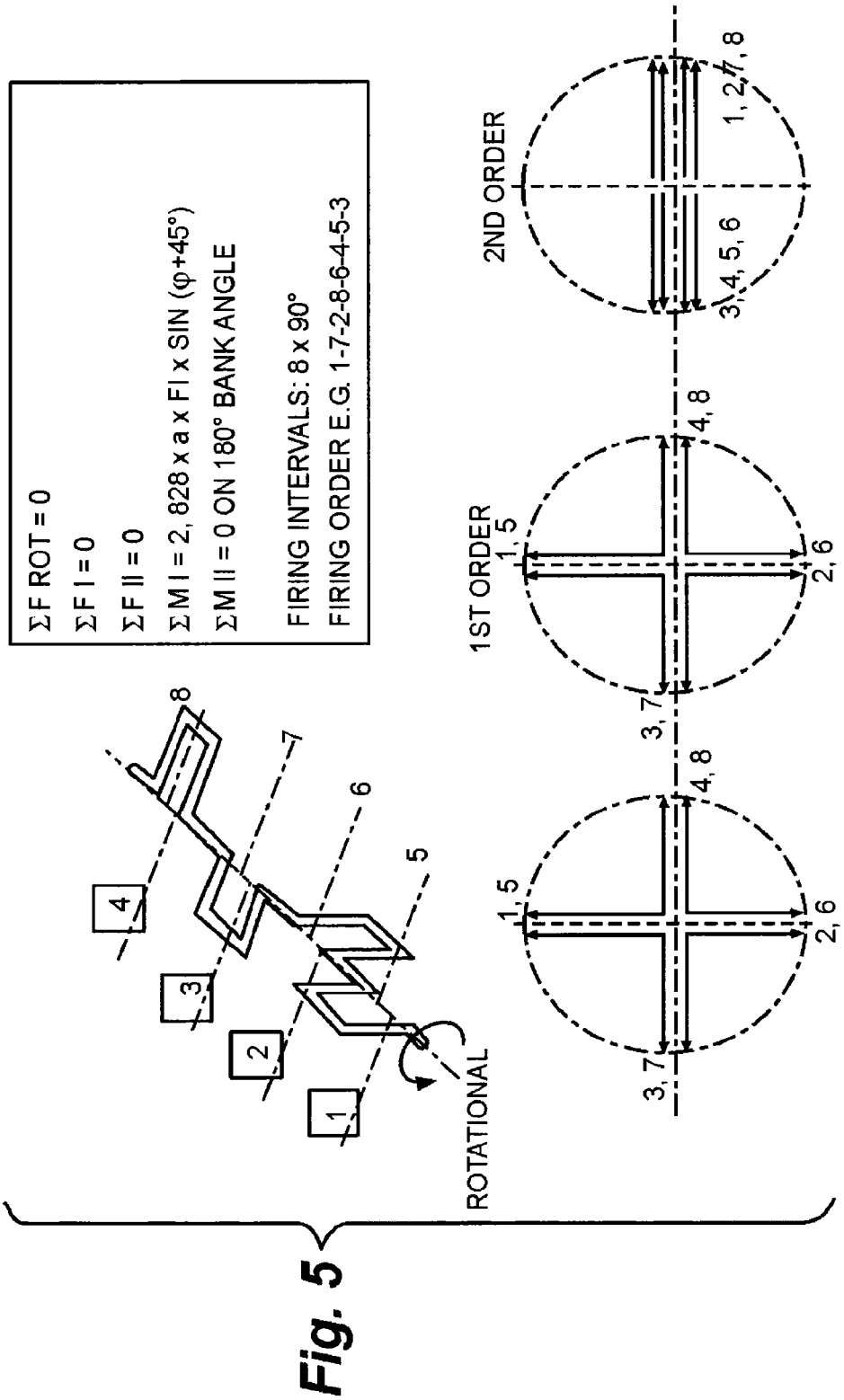
FIG. 5 is a graphic representation of the inertia forces on the crankshaft of the engine of claim 1.

The weight of the individual engine components and the engine architecture was selected to control the forces generated, but the physics of the engine train demands that the summation of forces follow the summations above, as depicted in FIG. 5.

Figure 4:
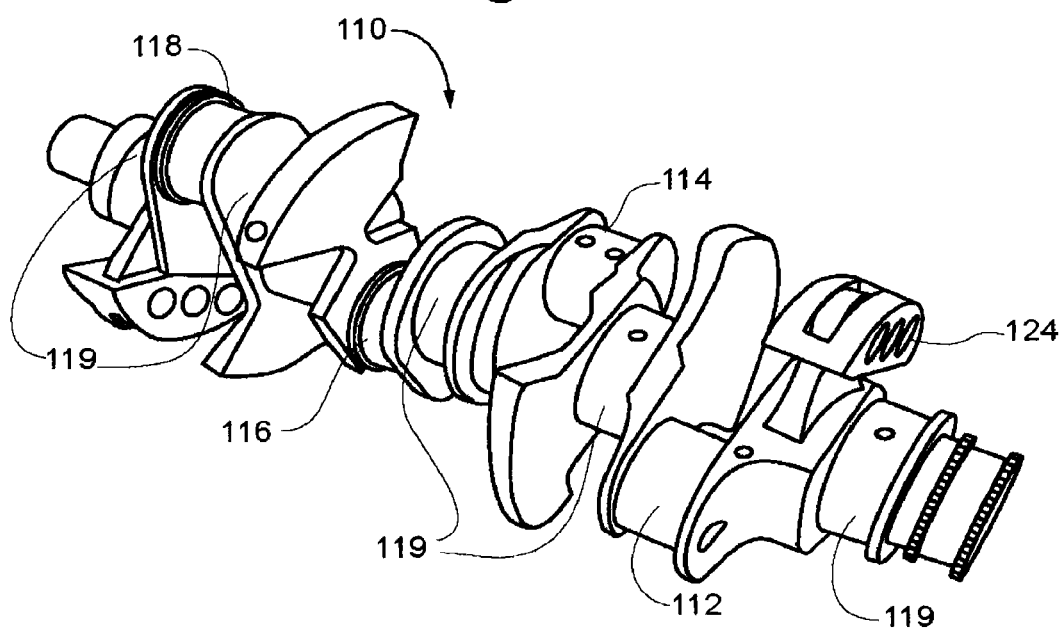
FIG. 4 is a perspective view of the crankshaft of the engine of claim 1.

The selected firing order has many possibilities within the crankshaft layout of the "paired throw" scheme adopted for the present engine 100. See the crankshaft 110 of FIG. 4. As depicted in FIG. 4, the crankshaft 110 has four paired throws, throw 112, throw 114, throw 116, and throw 118. A pair of connecting rods for the respective pistons of two cylinders, the cylinders being on opposed banks of cylinders (described below), are preferably rotatably coupled to each of the respective paired throws, 112, 114, 116, and 118, hence the term "paired'.

Conventions for Determination of Firing Order

Figure 6:
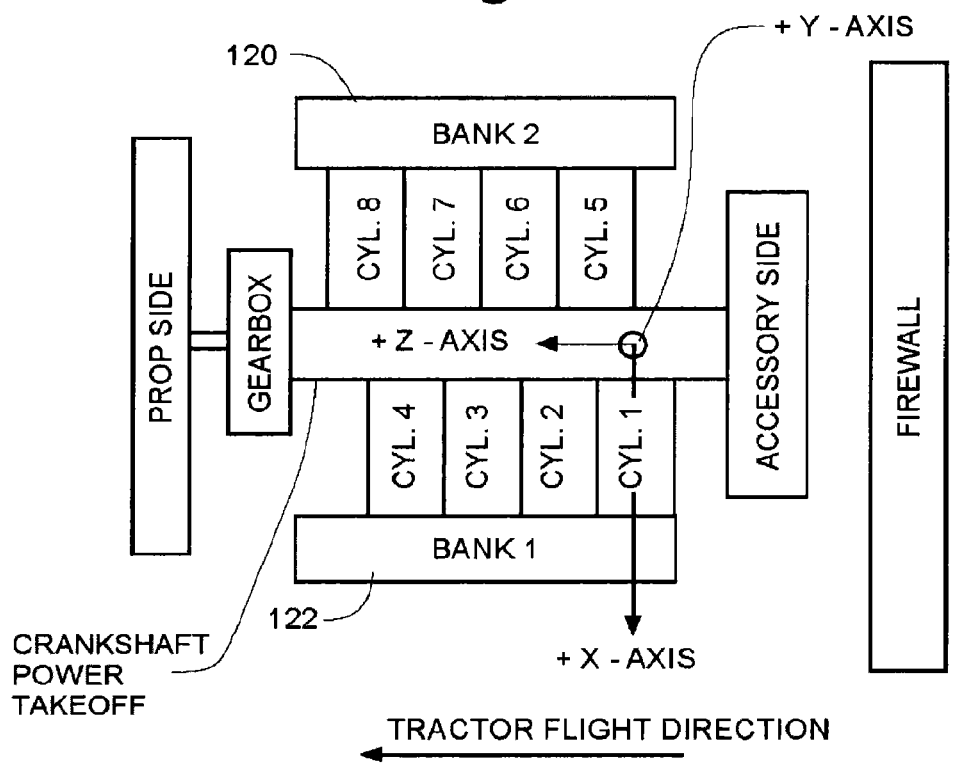
FIG. 6 is a graphic representation of the nomenclature convention of the engine.

The Flat Vee engine 100 includes eight cylinders that are numbered as shown in FIG. 6. The crankshaft 110 of FIG. 4 defines the y axis of FIG. 6. The cylinder nomenclature convention is used in conjunction with the paired throw crankshaft 110 as in FIG. 4. As noted in depiction for FIG. 6, there are two banks of four cylinders, bank 120 and opposed bank 122. Cylinders 1-4 proceed from the rear of the engine 100 to the front, or prop side, of the engine 100. Opposed cylinders 5-8 proceed from the rear of the engine 100 to the front, or prop side, of the engine 100. Cylinders 1 and 5 are rotatably coupled to paired throw 118. Cylinders 2 and 6 are rotatably coupled to paired throw 116. Cylinders 3 and 7 are rotatably coupled to paired throw 114. And, cylinders 4 and 8 are rotatably coupled to paired throw 112.

Fuel Systems Redundancy

Most modern diesel engines utilize a "common rail" injection scheme whereby a high-pressure fuel pump maintains approximately 2000 bar rail pressure. A rail pressure control valve maintains the rail pressure, and each injector is fired individually by an electronic signal, the rail pressure control valve and each injector being operably coupled to and controlled by an Engine Control Unit (ECU).

Within the confines of the above noted conventions, a configuration that would most appropriately fit the requirements of the general aviation application was determined by the applicant, keeping in mind that the engine was to be of compression combustion design. It is appreciated that a compression combustion design has very different considerations from a gasoline fueled engine. Each of the following elements was considered as the design proceeded toward its final solution for the present engine 100.

The present engine 100 is designed to have a higher cylinder count (eight) than current aero engines (generally six cylinders). This is done, at least in part, because of the higher cylinder pressure of a compression combustion engine acting on the crankshaft bearing as compared to present gasoline engines wherein combustion is initiated by a spark. An advantage of the higher cylinder count is that the inherent inertia of the additional cylinders acts to smooth the engine torque, and regulate the torque delivery.

The design of the present engine 100 does not have "double firing", which conventionally gives a more uniform 90-degree interval over the four-stroke cycle. Double firing is firing two cylinders, one from each respective bank 120, 122, simultaneously. Accordingly, over the 720-degree cycle (two revolutions of the engine 100), all eight cylinders fire in 90-degree intervals.

Effective control of the vibrational level of a high-output 8-cylinder was included in the design of engine 100 using a combination of torque isolation elements and absorbers 124 coupled to the crankshaft 110, as depicted in FIG. 4. Such control permitted the consideration of what firing order could be used to make the engine 100 redundant in a 4-cylinder by 2-bank configuration. This presumption may be referred to as a 4×2 configuration for the present eight-cylinder engine 100. Such a configuration requires subdividing the engine 100 into two independent banks 120, 122 for maximum redundancy and effectiveness.

Figure 15:
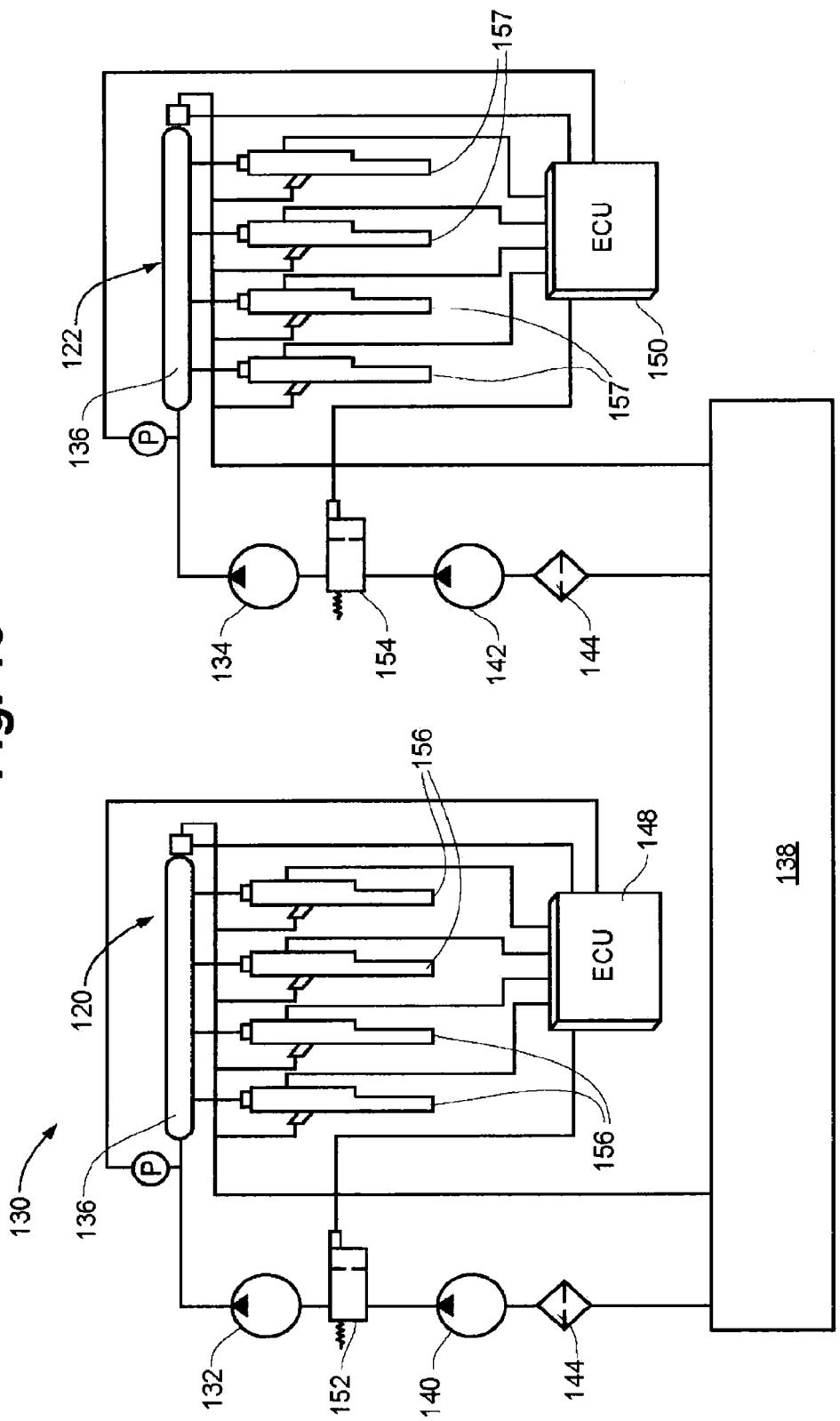
FIG. 15 is schematic representation of the bank-bank individual lubrication system flow of the present engine.

Referring to FIG. 15, the redundant fuel injection (FI) system 130 is depicted. In a modern common rail injection system it has been determined that the high-pressure fuel pump is the component most susceptible to failures. Accordingly, a dual pump strategy is included in the redundant FI system 130, having two high pressure fuel pumps, 132, 134. Recent advances in pump construction has lowered the combined component weight of pumps 132, 134 to within the weight range of a single previous generation pump.

The fuel rail 136 is typically an elongate, high strength "tube manifold" that preferably lies along each cylinder head as depicted in FIG. 15. Since the pumps 132, 134 are typically driven by a cam drive mechanism located at an end of the engine 100, it makes sense that the fuel components are integrated in a cylinder head module.

As noted in FIG. 15, fuel is drawn from a common fuel tank 138 by low pressure pumps 140, 142, through respective fuel filters 144. The respective engine control units (ECU) 148, 150 electronically control a respective fuel metering valve, 152, 154. It should be noted that a single ECU may be employed as well, having the combined functions of the respective engine control units (ECU) 148, 150. Fuel is made available by the respective fuel metering valve, 152, 154 to the respective high pressure fuel pumps, 132, 134 and thence to the respective fuel injectors 156 of the respective banks 120 and 122.

Cylinders 1,2,3,4 are grouped in a first bank 122 and cylinders 5,6,7,8 are grouped in an opposed second bank 120 as depicted in FIG. 6. This method of grouping essentially electronically splits the engine 100 in a 4×2 configuration that follows bank 122, 120 architecture, as described immediately above.

Accordingly, engine 100 is comprised of two four-cylinder engines that share the same crankshaft, and some other engine ancillaries, but are able to operate independently of each other. The mechanical oil and cooling systems are advantageously shared by the two four-cylinder engines, but each of the two four-cylinder engines essentially operates independently of the other, whether the engine 100 is operating with eight cylinders firing or with only one of the two four-cylinder engines firing. Preferably, a dual Engine Control Unit (ECU), performing the functions of ECU's 148, 150, offers near complete electrical separation of the engine 100 in a 4×2 scheme. The ECU's 148, 150 are capable of shutting either (or both simultaneously, for that matter) of the two four-cylinder engine banks 120, 122 down simply by stopping fuel flow through the respective fuel metering valve, 152, 154, or by not electrically pulsing the corresponding injectors 156, as desired.

Turbocharging Systems Duality

The concept of 4×2 duality noted above requires duality of the air charging system for each of the two four-cylinder engines. Most single-engine installations in an aircraft utilize a tricycle gear configuration in which the nose gear must be integrated in the engine bay. This alone makes it desirable to integrate a twin-turbo installation in the engine 100 in order to provide adequate space for the wheel well necessary to stow the nose gear during non landing/takeoff flight configurations of the aircraft.

Figure 9:
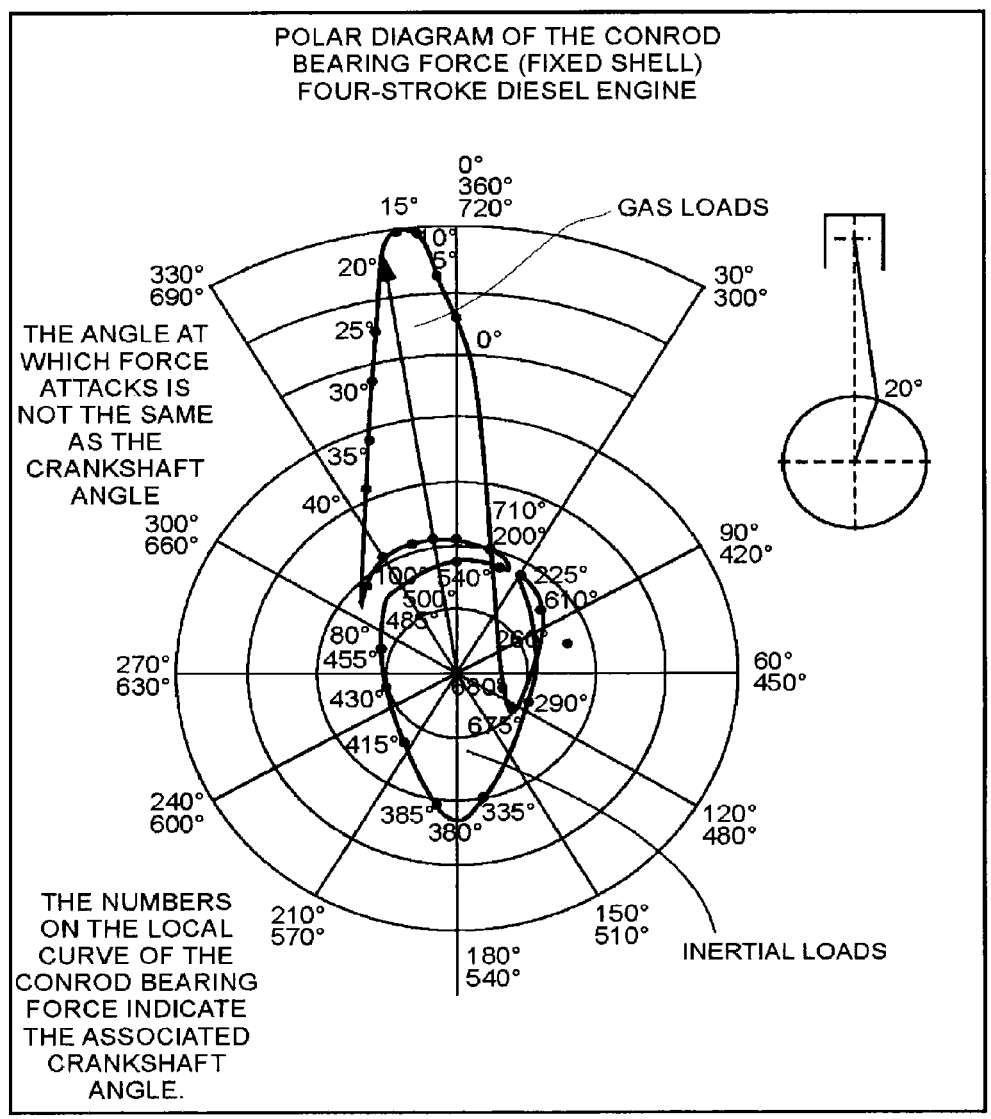
FIG. 9 is a graphic depiction of combined inertial and gas loading of a conrod bearing of the engine.

Additionally, since the main bearings 119 of the crankshaft 110 (see FIG. 4) are always subjected to similar inertial loads whenever the engine 100 is turning at a given engine rpm, it must be determined when to integrate the gas forces generated by the firing of the respective cylinders with the inertial loads. This is effected by selecting the firing order of the engine 100. The conrod gas forces are compared to the inertial forces in FIGS. 8 and 9. These are the same forces transferred to the crankshaft 110 main bearings during combustion in a particular cylinder.

Figure 7:
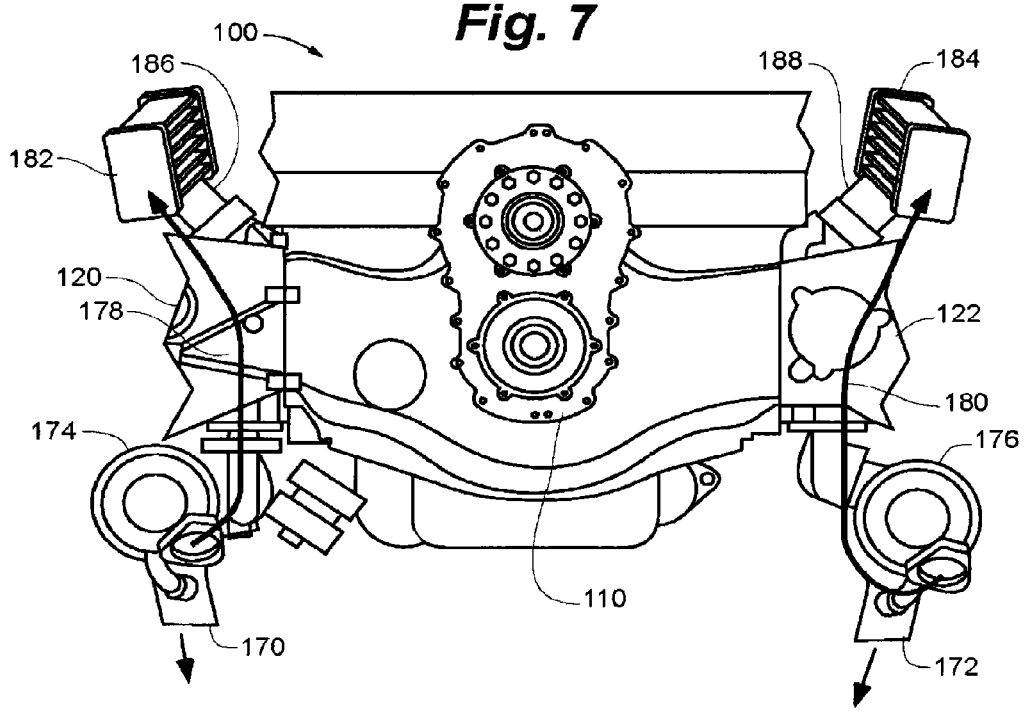
FIG. 7 is a frontal depiction of the twin turbo arrangement with a bank-bank charging scheme.

FIG. 7 shows a layout that separates the air handling on a bank-bank scheme for 4×2 operation. The idea of such a scheme is to separate the air charging so that if half of the engine (for example bank 120) "quits" or is shut down, the second bank 122 does not lose its charge air pressure by a loss of input from the non-operating bank 120. Thus the exhaust and induction systems are separated to match the electrical redundancy put forth in the longitudinal 4×2 scheme noted above. FIG. 7 depicts exhaust 170, 172 that drives the turbine portion of the respective turbos, 174, 176. The compressor portion of the respective turbos, 174, 176 provides charged air via the respective arrows 178, 180 to respective intercoolers 182, 184. It is understood the dedicated plumbing conveys the charged air form the respective turbos 174, 176 to the respective intercoolers 182, 184. Intake runners 186, 188 provide charged, cooled air to the intakes of the respective banks 120, 122. Accordingly, the engine 100 is provided with redundant. independent bank-bank induction/exhaust systems.

Another advantage of such a redundant bank-bank induction/exhaust system is discussed below in coinjunction with requirements for long descents, where it may be advantageous to "shut down" half (either bank 120 or 122, as desired) of the engine 100.

Main Bearing Loading

Figure 10:
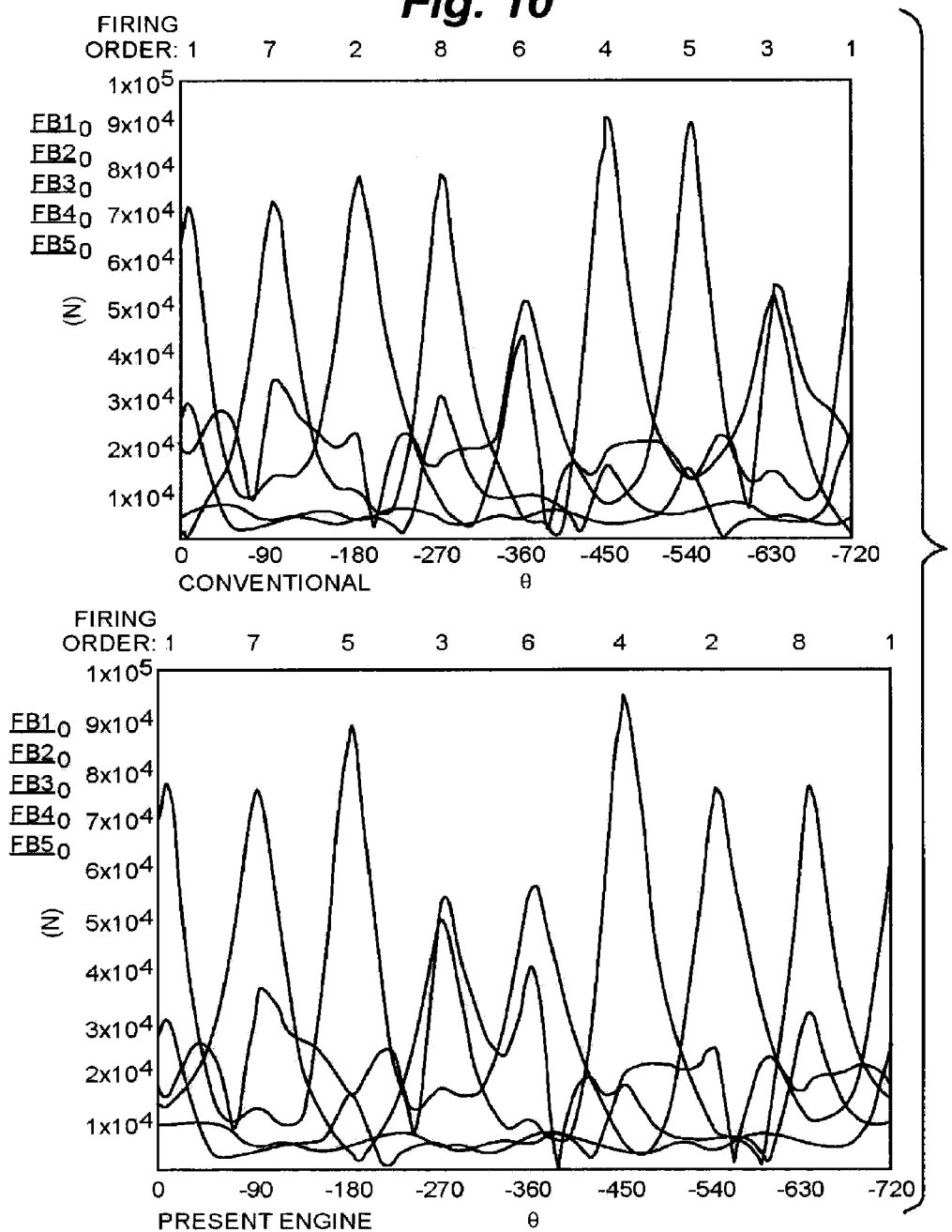
FIG. 10 is a graphic depiction of main bearing loadings of a conventional V-8 engine (above) and of the engine of the present invention (below)

The engine 100 is designed to avoid "dual loading" of main bearings on a bank-bank basis. Inertia and cylinder pressures are typically carried by one of the 5 main bearings in any eight-cylinder, vee-engine as depicted in the upper portion of FIG. 10. Either of these forces (inertia or cylinder pressures) may load the hydrodynamic bearings (the thin film of oil coating of a particular bearing) until the oil film is degraded to a terminal level. In practice, the crankshaft never actually "touches" its main bearing as it rotates due to the presence of an interposed oil film layer. The main bearing parameters are depicted in FIG. 8. Avoiding paired firings on a particular paired bearing is an important consideration in calculating the longevity of the rotating components of the engine 100. The design of the present engine avoids such firings. Bearing loading of a typical prior art V type eight cylinder engine is depicted in the upper portion of FIG. 10. Bearing loading of the engine 100 is depicted in the lower portion of FIG. 10. It should be noted that novel firing order of the present engine 100 results in bearing loading that is quite similar to that of the prior art V type engine. There is, therefore, no particular load condition that that would recommend the V configuration over the flat condition and vice versa.

Descent from Altitude

Aircraft encounter a reduction in the required engine power in their descents from altitude. The time to descent is dependent on the glide ratio of a particular aircraft. Unmanned Aerial Vehicles (UAVs) are designed to spend as much time in theater as possible in their long missions supporting ground-based soldiers. This feature requires that they use a minimum level of power to loiter and the UAV descends slowly due to their "glider-like" flight characteristics.

Since diesel engines rely on compression ignition for combustion rather than spark plug ignition, the combustion resulting from compression ignition may become unstable due to the lack of control at the bottom range of the injector operation (i.e. operation at minimum fuel usage).

Each injector in the compression combustion engine 100 is designed to have a wide range of operation. Modern fuel injectors are designed to give multiple fuel pulses is a single injection event to shape the combustion pressure curve of the event for low speed and low load driving. In many cases the common rail pressure is decreased to compensate for the switching speed of the injector. This is at the expense of the most efficient injector fuel atomization that occurs when the engine is heavily loaded. The decreased efficiency of fuel atomization typically acts to decrease engine efficiency.

The amount of power required during aircraft descents may be low enough to warrant shutting off one of the banks 120, 122 of the engine 100. This strategy of the ECU 148 or 150 (see FIG. 15) accomplishes several useful things:

the strategy allows the injectors of the operating bank 120 or 122 of cylinders to operate well within their designed range at higher fuel delivery conducive to best fuel atomization;

the frictional load of an eight cylinder engine is maintained even with one bank 120, 122 shut down, thereby allowing the engine 100 to remain thermally stable from a combustion perspective;

the fuel economy and range of the aircraft is extended during long descents;

in situations where the fuel supply is approaching absolute minimum, the pilot has the option to extend the range of the aircraft and make a safe landing without running out of fuel; and propeller dynamics are maintained with the appropriate firing order, by still allowing the advantageous rate shaping of the injected fuel in the operating bank 120 or 122 that is possible at the higher power setting of the operating four cylinder engine portion (bank 120 or 122) of the engine 100.

Details of the Firing Order

The engine 100 of the present invention employs a unique firing order, which is especially valid from a redundancy perspective in the 4×2 configuration. As mentioned above, there is no clear benefit of the present firing order for an eight-cylinder engine from a main bearing load perspective as compared to a prior art V shape, eight cylinder engine. The advantages of the firing order adopted for the engine 100 become apparent when other aspects are considered.

The adopted firing order, 1-7-5-3-6-4-2-8, of the engine 100 gives a relatively even cylinder firing when running the engine 100 as a 4 cylinder engine either bank 120, 122 deactivated. Deactivation is effected by engine control of an ECU 148, 150 on a selected bank 120 or 122, as depicted in FIG. 15. The effect of relatively even firing has the effect of improving turbocharger performance as well and positively affecting the torsional response of the engine-propeller system.

There is no "double firing" to adversely affect a paired bearing, which firing may break down oil films or set the engine crankshaft 110 into a bending resonance.

The engine 100 can be selectively split into a 4×2 configuration that effects a bank-bank separation. Such splitting acts to separate the engine in the manners indicated below:

electrically from an engine management perspective (FIG. 15);

induction from an air charging and exhaust perspective (FIG. 7); and from a fueling perspective, when using a dual pump strategy as described above (FIG. 15).

Figure 11:
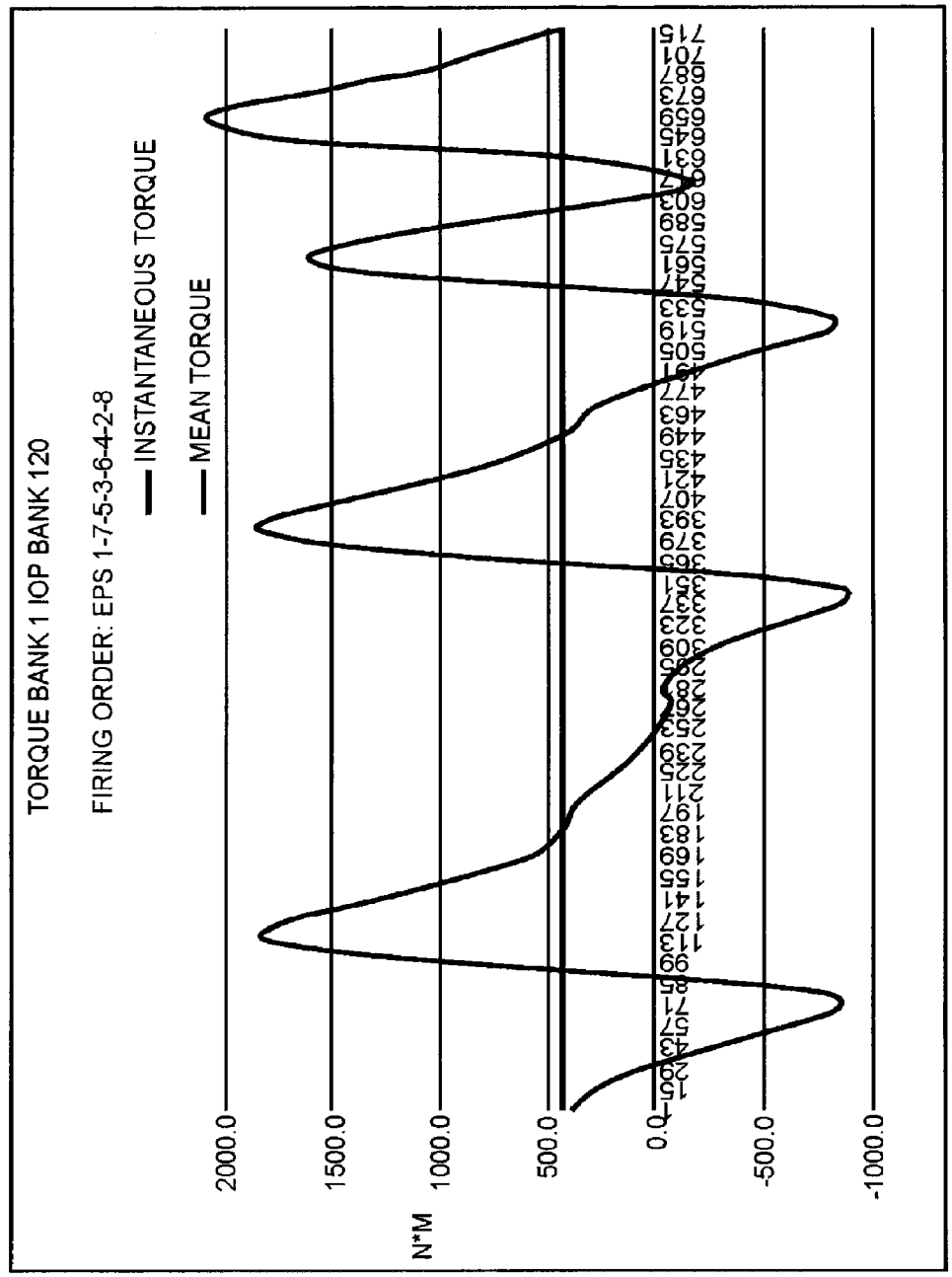
FIG. 11 is a graphic depiction of engine loading when a first bank only is operating.
Figure 12:
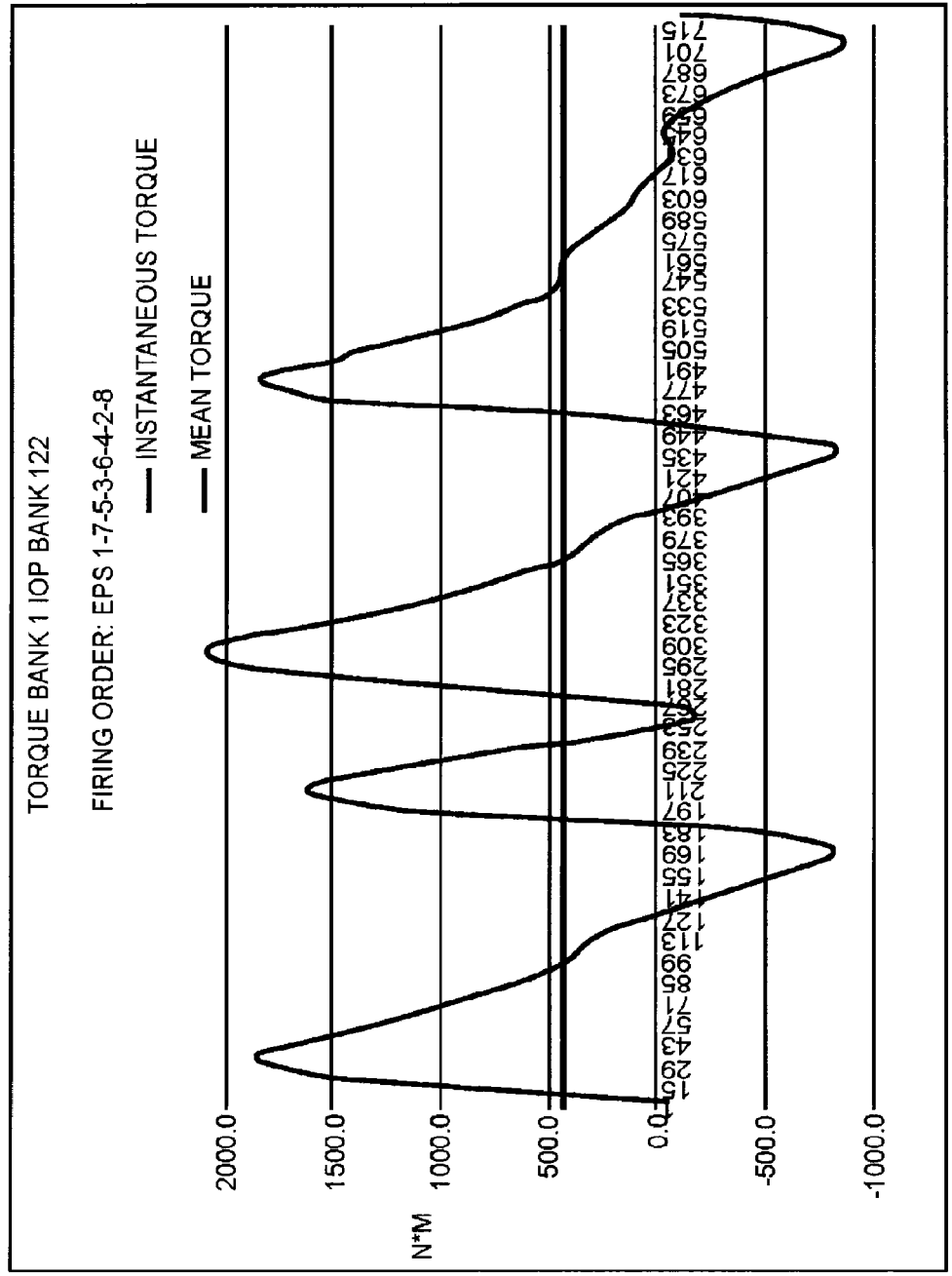
FIG. 12 is a graphic depiction of engine loading when a second bank only is operating.
Figure 13:
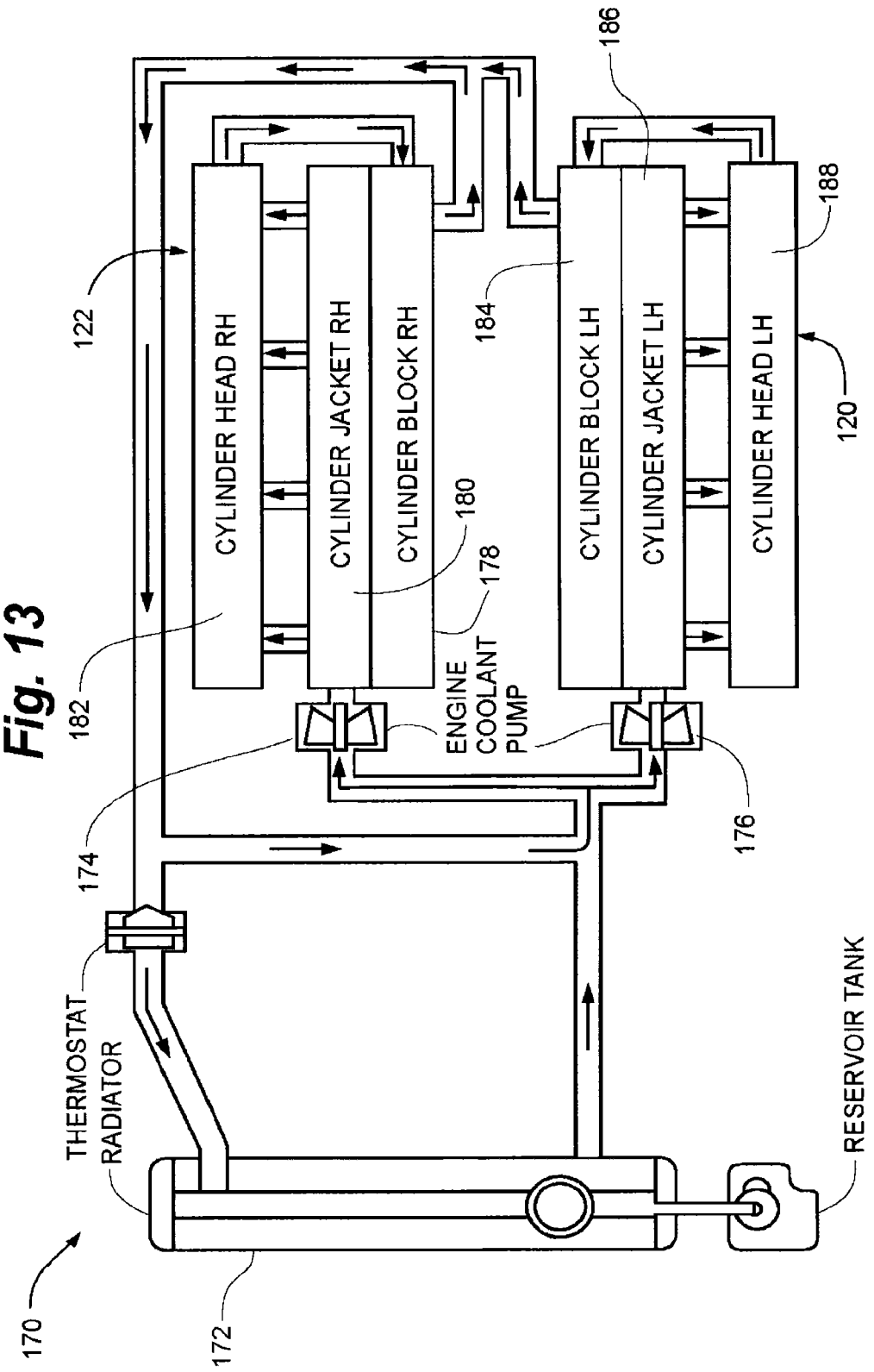
FIG. 13 is schematic representation of the unitary coolant system flow of the present engine.
Figure 14:
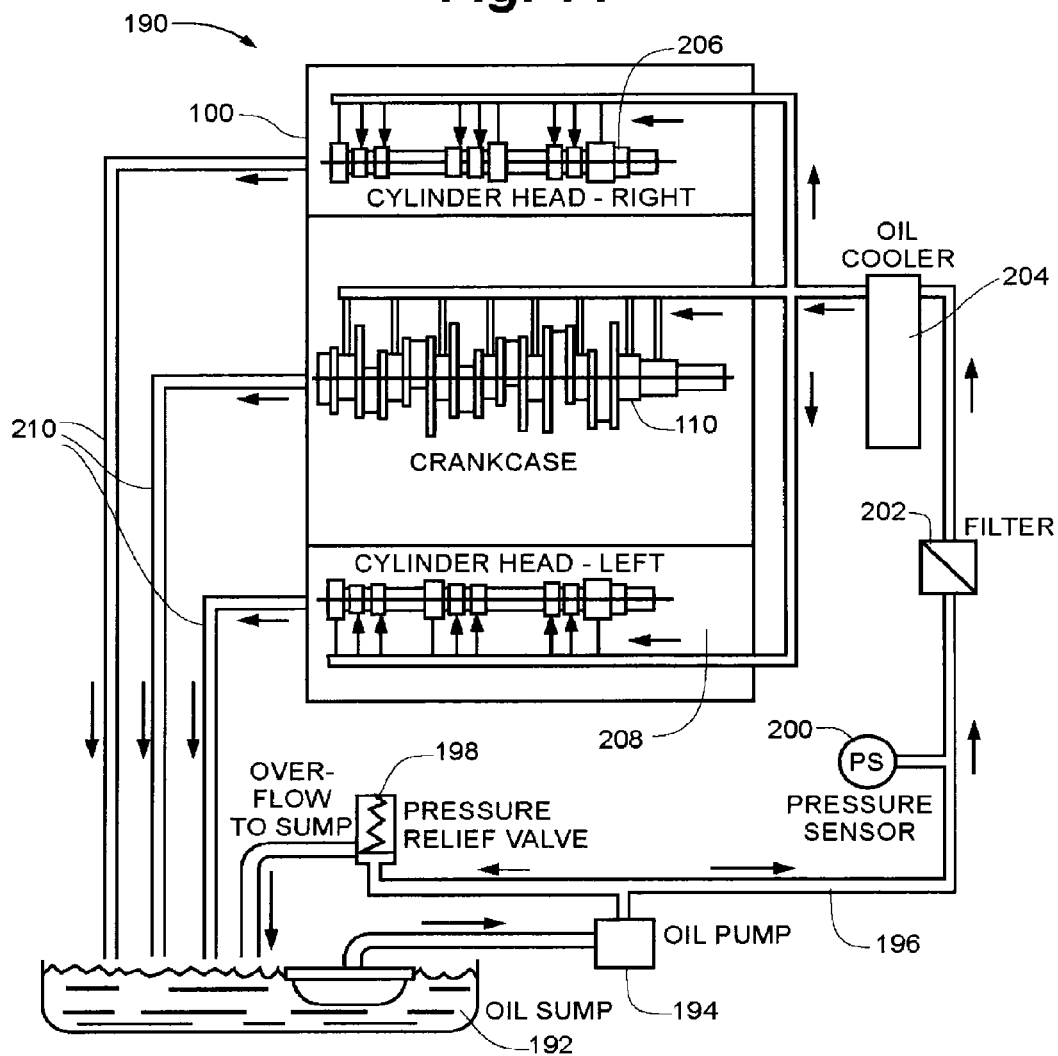
FIG. 14 is schematic representation of the unitary lubrication system flow of the present engine.

Further, the shared systems help to enhance the engine 100 as a whole. The following systems are shared to enhance engine 100 function:

as depicted in FIG. 13, the cooling system is shared to act as a large thermal battery, and ensure the second bank is ready to "re-light" as desired;

as depicted in FIG. 14, the lubrication system is shared to ensure the engine 100 does not lose its main bearing oil supply and thermal capacity of the oil cooling system; and the inertia of the 8-cylinder is used to moderate the torque signature of a typical 4-cylinder engine. The added inertia still acts as a large inherent flywheel, although 4 cylinders may not be firing. See FIGS. 11 and 12 for the torque signatures of the respective banks 120, 122.

FIG. 13 is a schematic representation of the coolant system 170 of the engine 100. The coolant system 170 is single system for the engine 100 without regard to the operating condition of the respective banks 120, 122. Coolant is drawn from a radiator 172. The coolant is provided simultaneously to pumps 174, 176. Pump 174 supplies coolant to bank 122 and pump 176 supplies coolant to bank 120. Pump 174 pumps coolant through cylinder block 178, cylinder jacket 180 and cylinder head 182. Simultaneously, pump 176 pumps coolant through cylinder block 184, cylinder jacket 186 and cylinder head 188. Accordingly, under all conditions of operation, coolant is supplied to the entire engine 100.

FIG. 14 is a schematic representation of the lubrication system 190 of the engine 100. The lubrication system 190 is single system for the engine 100 without regard to the operating condition of the respective banks 120, 122. It is understood that all the rotating components of the engine 100 rotate regardless of the operating condition of the engine 100. That is regardless whether the engine 100 is operating with all eight cylinders firing or whether one or the other bank 120, 122 is firing by itself. Lubrication must therefore be provided to all the rotating components of the engine 100 at all times of operation. Lubrication is drawn from an oil sump 192 by an oil pump 194. The oil pump 194 generates oil pressure in the line 196. Such pressure will open the relief valve 198 if the pressure exceeds a certain level and will then port oil back to the sump 192. Pressurized oil is sent past a pressure sensor 200 and through a filter 202 to oil cooler 204. From the oil cooler 204, the oil is sent to the crankshaft 110 and to the cylinder heads 206, 208. After lubricating the crankshaft 110 and the cylinder heads 206, 208, low pressure oil is then sent back to the oil sump 192 via the lines 210. In accordance with the above, it is noted that the entire engine 100 is lubricated by an integrated, common oil system 190 and this is the case under all operating conditions.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

The invention claimed is:

1. A compression ignition engine having a flat, opposed eight cylinder arrangement, comprising:
 a first bank having four cylinders;
 a first turbocharger coupled to an exhaust side of the first bank;
 a second bank having four cylinders, the first bank and the second bank separated by a vee angle of 180 degrees;
 a second turbocharger coupled to an exhaust side of the second bank; and
 a crankshaft having four crankpins and being configured such that opposing pistons from the first bank and from the second bank are coupled to the same crankpin, wherein the four cylinders in the first bank are numbered 1 through 4 commencing at an end of the engine and the four cylinders in the second bank are numbered 5 through 8 commencing at the same end of the engine and the firing order is 1-7-5-3-6-4-2-8,
 wherein the first bank and the second bank are independently operable.

2. The compression ignition engine of claim 1, wherein the first turbocharger is coupled to an intake side of the first bank, and further wherein the second turbocharger is coupled to an intake side of the second bank.

3. The compression ignition engine of claim 1, further comprising a first engine control unit operably connected to the first bank, and a second engine control unit operably connected to the second bank.

4. The compression ignition engine of claim 1, wherein the first bank and the second bank are electrically independent.

5. The compression ignition engine of claim 1, further comprising a first fuel control system operably connected to the first bank, and a second fuel control system operably connected to the second bank, the first fuel control system and the second fuel control system being independently operable.

6. A method of forming an engine, including forming the engine of a flat, opposed eight cylinder arrangement with four cylinders in a first bank and four cylinders in an opposed second bank, the first bank and the second bank separated by a vee angle of 180 degrees, the engine including:
 a first turbocharger coupled to an exhaust side of the first bank;
 a second turbocharger coupled to an exhaust side of the second bank; and
 a crankshaft having four crankpins and being configured such that opposing pistons from each bank are coupled to the same crankpin, and numbering the four cylinders in the first bank 1 through 4 commencing at an end of the engine and numbering the four cylinders in the second bank 5 through 8 commencing at the same end of the engine and establishing a firing order as 1-7-5-3-6-4-2-8,
 wherein the first bank and the second bank are independently operable.

7. The method of forming the engine of claim 6, wherein the first turbocharger is coupled to an intake side of the first bank, and further wherein the second turbocharger is coupled to an intake side of the second bank.

8. The method of forming the engine of claim 6, further comprising:
 providing a first engine control unit operably connected to the first bank; and
 providing a second engine control unit operably connected to the second bank.

9. The method of forming the engine of claim 6, wherein the first bank and the second bank are electrically independent.

10. The method of forming the engine of claim 6, further comprising:
 providing a first fuel control system operably connected to the first bank; and
 providing a second fuel control system operably connected to the second bank, the first fuel control system and the second fuel control system being independently operable.

11. An engine, comprising:
 a first bank of four cylinders numbered 1 through 4 commencing at an end of the engine, each cylinder configured to receive a piston;
 a first turbocharger coupled to an exhaust side of the first bank;
 a second bank of four cylinders numbered 5 through 8 commencing at the same end of the engine, each cylinder configured to receive a piston;
 a second turbocharger coupled to an exhaust side of the second bank; and
 a crankshaft, having four crankpins and being configured such that opposing pistons from the first bank and from the second bank are coupled to the same crankpin,
 wherein the first bank of cylinders and the second bank of cylinders are separated by a vee angle of 180 degrees and further wherein the engine has a firing order as 1-7-5-3-6-4- 2-8, and further wherein the first bank and the second bank are independently operable.

12. The engine of claim 11, wherein the first turbocharger is coupled to an intake side of the first bank, and further wherein the second turbocharger is coupled to an intake side of the second bank.

13. The engine of claim 11, further comprising a first engine control unit operably connected to the first bank, and a second engine control unit operably connected to the second bank.

14. The engine of claim 11, wherein the first bank and the second bank are electrically independent.

15. The engine of claim 11, further comprising a first fuel control system operably connected to the first bank, and a second fuel control system operably connected to the second bank, the first fuel control system and the second fuel control system being independently operable.

* * * * *